United States Patent [19]
Belser et al.

[11] Patent Number: 6,151,324
[45] Date of Patent: *Nov. 21, 2000

[54] AGGREGATION OF MAC DATA FLOWS THROUGH PRE-ESTABLISHED PATH BETWEEN INGRESS AND EGRESS SWITCH TO REDUCE NUMBER OF NUMBER CONNECTIONS

[75] Inventors: David Belser, Penacook; Richard Bussiere, Manchester; Jeff Cioli, Derry; Brendan Fee, Nashua, all of N.H.; William T. Haggerty, Dunstable, Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,414

[22] Filed: Jun. 3, 1996

[51] Int. Cl.⁷ .................................................. H04L 12/48
[52] U.S. Cl. .......................... 370/397; 370/355; 370/409; 709/238
[58] Field of Search .................................. 370/397, 409, 370/355, 356, 359, 392; 395/200.68, 200.75, 200.57; 709/238

[56] References Cited

U.S. PATENT DOCUMENTS

| | | | |
|---|---|---|---|
| 5,193,152 | 3/1993 | Smith | 709/220 |
| 5,329,527 | 7/1994 | Vjihashi et al. | 370/397 |
| 5,357,508 | 10/1994 | Le Boudee et al. | 370/397 |
| 5,365,524 | 11/1994 | Hiller et al. | 370/376 |
| 5,408,469 | 4/1995 | Opher et al. | 370/399 |
| 5,420,858 | 5/1995 | Marshall et al. | 370/352 |
| 5,432,785 | 7/1995 | Ahmed et al. | 370/231 |
| 5,452,296 | 9/1995 | Shimizu | 370/399 |
| 5,485,455 | 1/1996 | Dobbins et al. | 370/255 |
| 5,638,364 | 6/1997 | Sugita | 370/397 |
| 5,699,347 | 12/1997 | Callon | 370/238 |
| 5,706,279 | 1/1998 | Teraslinna | 370/232 |
| 5,825,772 | 10/1998 | Dobbins et al. | 370/396 |
| 6,069,889 | 5/2000 | Feldman et al. | 370/351 |

FOREIGN PATENT DOCUMENTS

| | | |
|---|---|---|
| 0 473 066A | 4/1992 | European Pat. Off. . |
| 0 609 990 A2 | 8/1994 | European Pat. Off. . |

OTHER PUBLICATIONS

J.-Y. Le Boudec and H.L. Truong, "Providing MAC Services on an ATM Network with Point–To–Point Links," Proceedings of Interworking 1992, Nov. 1992, Amsterdam, NL, pp. 252–260, XP002043448.

Hong Linh Truong: "LAN Emulation on an ATM Network," IEEE Communications Magazine, vol. 33, No. 5, pp. 70–85, XP000518773 May 1995.

(List continued on next page.)

*Primary Examiner*—Kenneth S. Kim
*Attorney, Agent, or Firm*—Wolf, Greenfield & Sacks, P.C.

[57] ABSTRACT

A method and apparatus are provided for connection-oriented switching in a communications network wherein a pre-established path is established between a select pair of an ingress switch and an egress switch. The use of pre-established paths enables a reduction in the total number of connections required inside the switch cloud, reduces the CPU load on trunk switches, and shortens the time for connection setup. In the embodiment described, the DA/SA fields of a MAC frame data packet are replaced with a "virtual path", which identifies the pre-established path between the ingress and egress switches. A "virtual circuit" is provided in another field of the modified packet which specifies the out-port and out-header on the egress switch for demultiplexing the modified packet upon receipt at the egress switch. The virtual circuit is exchanged between the ingress and egress switches at connection setup. The virtual path is assumed to already be in place, and known to both switches, prior to connection setup.

20 Claims, 11 Drawing Sheets

OTHER PUBLICATIONS

Tirtaatmadja, E. et al.: "The Application of Virtual Paths to the Inteconnection of IEEE 802.6 Metropolitan Area Networks," Innovations in Switching Technology, Stockholm, May 28–Jun. 1, 1990, vol. 2, Institute of Electrical and Electronic Engineers, pp. 133–137, XP000130857.

Gerla, M., et al.: "Internetting LAN's and MAN's to B–ISDN's for Connectionless Traffic Support," IEEE Journal on Selected Areas in Communications, vol. 11, No. 8, pp. 1145–1159, XP000491811.

Cheriton et al., "Host Groups: A Multicast Extension For Datagram Internetworks," Data Communications Symposium, Sep. 1985, pp. 172–179 (USA).

"Method For Assigning Network Applications To Users and Groups," IBM Technical Disclosure Bulletin, vol. 37, No. 4b, p. 611 Apr. 1994 (New York, USA).

C.D. Comer, "Internetworking with TCP/IP, vol. 1, Principals, Protocols and Architecture," Prentice Hall, Englewood Cliffs, New Jersey, 2nd Ed., Chap. 16, pp. 265–280.

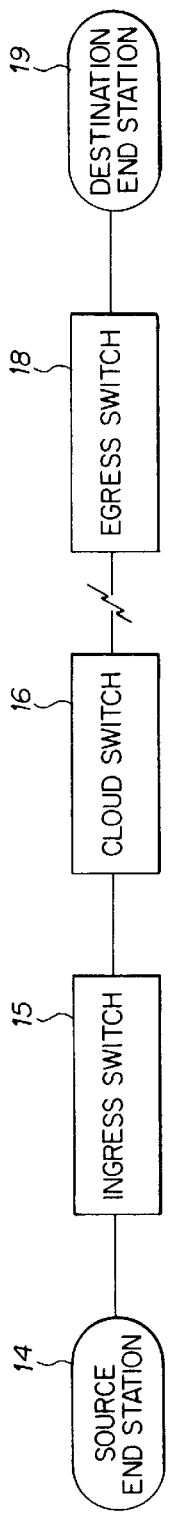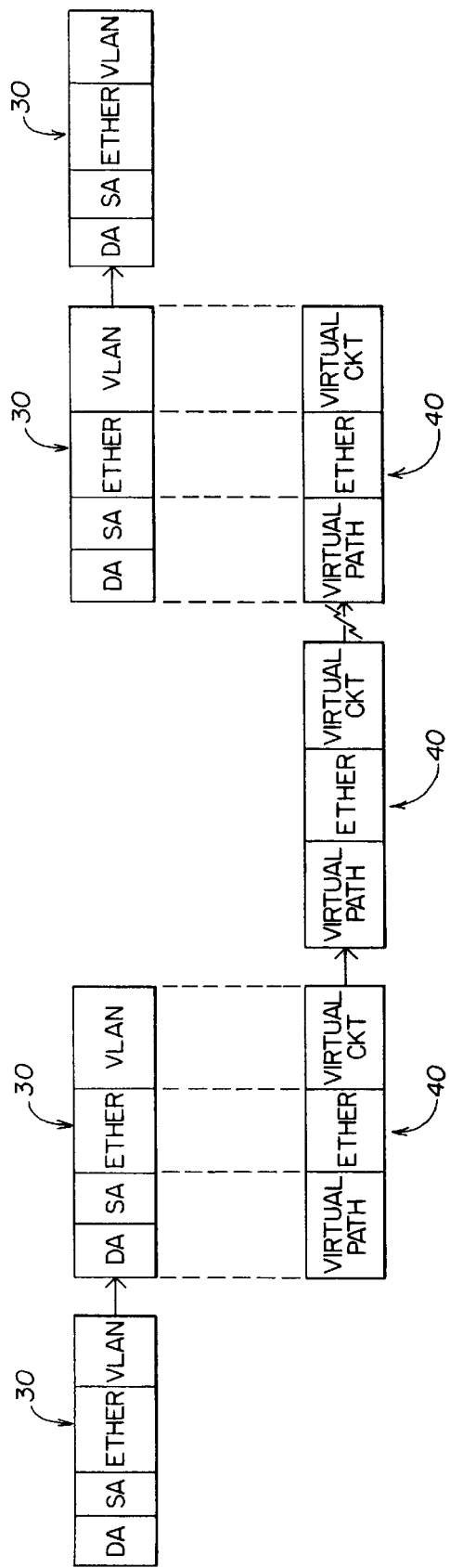
FIG. 3A
FIG. 3B

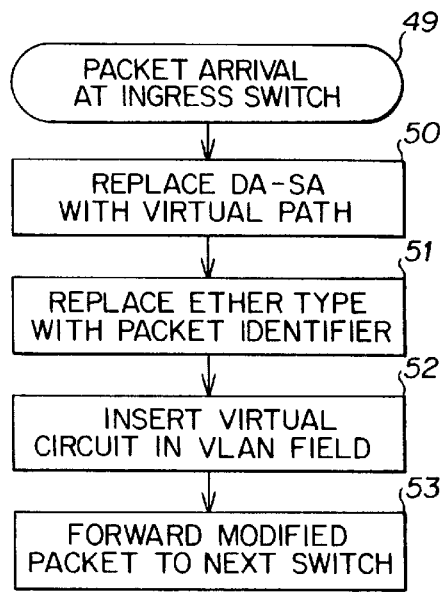
FIG. 4A
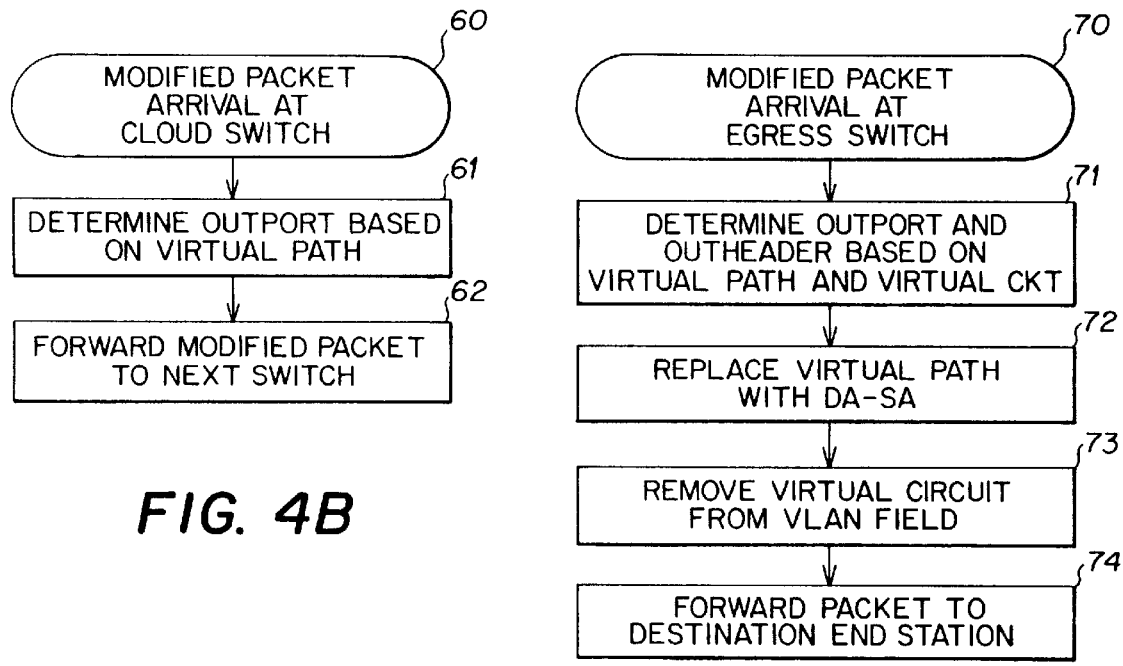
FIG. 4B
FIG. 4C

| SWITCH PORT | DEVICE MAC ADDRESS | NODE STATE | CALL TAG | LAST HEARD | AGE | ALIAS COUNT | VLAN COUNT |
|---|---|---|---|---|---|---|---|
| 2 | 08:00:20:18:7A:E4 | LOCAL | 3860 | 0 days 00:00:00.00 | 0 days 00:10:46.14 | 1 | 1 |
| 6 | 00:00:10:1A:12:DE | VIRTUAL NODE | 0000 | 0 days 00:00:00.00 | 0 days 00:00:00.00 | 1 | 0 |
| 1 | 00:00:F6:00:5E:EB | LOCAL | 372b | 0 days 00:00:00.00 | 0 days 00:11:23.56 | 1 | 1 |
| 2 | 00:00:F6:00:5D:E7 | LOCAL | 3716 | 0 days 00:00:00.00 | 0 days 00:10:47.02 | 1 | 1 |
| 2 | 08:00:20:0E:47:C4 | LOCAL | 3870 | 0 days 00:00:00.00 | 0 days 00:10:46.19 | 1 | 1 |
| 2 | 08:00:20:1F:FF:8F | LOCAL | 37e3 | 0 days 00:00:00.00 | 0 days 00:10:47.18 | 1 | 1 |
| 2 | 08:00:20:1F:C1:72 | LOCAL | 37d5 | 0 days 00:00:00.00 | 0 days 00:10:47.34 | 1 | 1 |
| 2 | 08:00:20:20:00:6D | LOCAL | 37f7 | 0 days 00:00:00.00 | 0 days 00:10:47.12 | 1 | 1 |
| 2 | 08:00:20:73:C9:11 | LOCAL | 3800 | 0 days 00:00:00.00 | 0 days 00:10:47.09 | 1 | 1 |
| 2 | 00:00:78:00:01:BE | LOCAL | 3892 | 0 days 00:00:00.00 | 0 days 00:10:46.08 | 1 | 1 |
| 1 | 08:00:69:07:9C:68 | LOCAL | 37c3 | 0 days 00:00:00.00 | 0 days 00:11:22.74 | 1 | 1 |
| 2 | 00:00:1D:0E:94:57 | LOCAL | 3851 | 0 days 00:00:00.00 | 0 days 00:10:46.54 | 1 | 1 |
| 1 | 00:00:8E:06:12:52 | LOCAL | 37c0 | 0 days 00:00:00.00 | 0 days 00:11:22.89 | 1 | 1 |
| 2 | 00:00:1D:18:67:38 | LOCAL | 37cd | 0 days 00:00:00.00 | 0 days 00:10:47.60 | 1 | 1 |
| 2 | 08:00:20:71:A0:D6 | LOCAL | 37da | 0 days 00:00:00.00 | 0 days 00:10:47.51 | 1 | 1 |
| 1 | 00:00:1D:0B:67:3B | LOCAL | 37bd | 0 days 00:00:00.00 | 0 days 00:11:22.99 | 1 | 1 |
| 1 | 00:00:1D:17:FC:2E | LOCAL | 37c2 | 0 days 00:00:00.00 | 0 days 00:11:22.92 | 0 | 1 |
| 2 | 00:00:1D:1E:89:FE | LOCAL | 3890 | 0 days 00:00:00.00 | 0 days 00:10:46.31 | 1 | 1 |
| 1 | 00:00:1D:1F:12:FA | LOCAL | 0000 | 0 days 00:00:00.00 | 0 days 00:11:23.88 | 0 | 1 |

*FIG. 6A*

| OWNER SWITCH | SWITCH PORT | DEVICE MAC ADDRESS | ALIAS TYPE | ALIAS ADDRESS | VLAN POLICY | VLAN ID |
|---|---|---|---|---|---|---|
| 00:00:1D:1A:12:DE | 2 | 00:00:1D:1E:89:FE | IP | 134.141.42.9 | 1-OTHER | RED |
| 00:00:1D:1A:12:DE | 2 | 00:00:1D:0E:94:57 | IP | 134.141.42.77 | 1-OTHER | RED |
| 00:00:1D:1A:12:DE | 2 | 08:00:20:1F:FF:67 | IP | 134.141.42.61 | 1-OTHER | BLUE |
| 00:00:1D:1A:12:DE | 2 | 00:00:1D:18:67:38 | IP | 134.141.109.54 | 1-OTHER | BLUE |
| 00:00:1D:1A:12:DE | 1 | 00:00:1D:18:67:38 | IP | 134.141.106.53 | 1-OTHER | RED |
| 00:00:1D:1A:12:DE | 1 | 00:00:E6:00:5E:EB | IP | 134.141.42.50 | 1-OTHER | BLUE |
| 00:00:1D:1A:12:DE | 2 | 08:00:69:07:9C:68 | IP | 134.141.43.42 | 1-OTHER | DEFAULT |
| 00:00:1D:1A:12:DE | 1 | 08:00:20:71:A0:DE | IP | 134.141.42.35 | 1-OTHER | RED |
| 00:00:1D:1A:12:DE | 2 | 00:00:1D:18:67:38 | IP | 134.141.40.32 | 1-OTHER | RED |
| 00:00:1D:1A:12:DE | 2 | 00:00:9E:05:12:52 | IP | 134.141.45.30 | 1-OTHER | RED |
| 00:00:1D:1A:12:DE | 2 | 03:00:20:75:C9:11 | IP | 134.141.43.29 | 1-OTHER | RED |
| 00:00:1D:1A:12:DE | 2 | 00:00:1D:18:67:38 | IP | 134.141.18020 | 1-OTHER | DEFAULT |
| 00:00:1D:1A:12:DE | 1 | 00:00:1D:0B:67:38 | IP | 0221667384006 | 1-OTHER | DEFAULT |
| 00:00:1D:1A:12:DE | 6 | 00:00:1D:13:12:DE | IP | 134.141.42.240 | 1-OTHER | DEFAULT |
| 00:00:1D:1A:12:DE | 2 | 00:00:F6:00:53:67 | IP | 134.141.42.213 | 1-OTHER | BLUE |
| 00:00:1D:1A:12:DE | 2 | 08:00:20:1F:C1:72 | IP | 134.141.42.212 | 1-OTHER | BLUE |
| 00:00:1D:1A:12:DE | 2 | 08:00:20:20:00:60 | IP | 134.141.42.201 | 1-OTHER | BLUE |
| 00:00:1D:1A:12:DE | 2 | 08:00:20:18:7A:E4 | IP | 134.141.42.150 | 1-OTHER | RED |
| 00:00:1D:1A:12:DE | 2 | 08:00:20:03:47:C4 | IP | 134.141.43.183 | 1-OTHER | RED |
| 00:00:1D:1A:12:DE | 2 | 00:00:78:00:01:BE | IP | 134.141.42.132 | 1-OTHER | BLUE |

| AreaID | Type | LSID | Switch ID | Sequence | AGE | Checksum | Advertisement |
|---|---|---|---|---|---|---|---|
| 0.0.0.0 | 1-switch-link | 08:00:20:1d:8f:0b:00:00:00:00 | 08:00:20:1d:8f:0b:00:00:00:00 | -2147483648 | 0 | 4035 | 00:00:00:08:00:20:0d:... |
| 0.0.0.0 | 1-switch-link | 08:00:20:20:00:7b:00:00:00:00 | 08:00:20:20:00:7b:00:00:00:00 | -2147483648 | 1 | 36505 | 00:01:00:01:08:00:20:20:... |
| 0.0.0.0 | 2-connection-link | 08:00:20:20:00:7b:00:00:00:02 | 08:00:20:20:00:7b:00:00:00:00 | -2147483648 | 1 | 35753 | 00:01:00:02:08:00:20:20:... |

FIG. 7B

| IPAddress | IPAddressLess | Switch ID | Options | Priority | State | Events | LSRetransQLen | NBMAStatus |
|---|---|---|---|---|---|---|---|---|
| 08:00:20:20:00:7b:00:00:00:02 | 0 | 08:00:20:20:00:7b:00:00:00:00 | 3 | 1 | 8-full | 7 | 0 | 1-valid |

FIG. 7C

| Switch Port Pair | SWDestAddr | Mask | LSTypeOne | LinkStateID | AdvR |
|---|---|---|---|---|---|
| 08:00:20:00:00:7b:00:00:00:02 | 08:00:20:00:00:7b:00:00:00:02 | 00:00:00:00:00:00:00:00:00:00 | 02 | 08:00:20:20:00:7b:00:00:00:02 | 08:00:... |

AGGREGATION OF MAC DATA FLOWS THROUGH PRE-ESTABLISHED PATH BETWEEN INGRESS AND EGRESS SWITCH TO REDUCE NUMBER OF NUMBER CONNECTIONS

FIELD OF THE INVENTION

This invention relates to a method and apparatus for providing connection aggregation within a switched communications network in which pre-established paths are provided in order to reduce the total number of connections required between switches.

BACKGROUND OF THE INVENTION

Most data communications networks today rely heavily on shared-media, packet-based LAN technologies for both access and backbone connections. These networks use bridges and routers to connect multiple LANs into global internets. However, such router-based networks cannot provide the high bandwidth and quality of service required by the latest networking applications and new faster workstations.

Switched networking is a proposed solution intended to provide additional bandwidth and quality of service. In such networks, the physical routers and hubs are replaced by switches and a management system is optionally provided for monitoring the configuration of the switches. The overall goal is to provide a scalable high-performance network where all links between switches can be used concurrently for connections.

One proposal is to establish a VLAN switch domain. A VLAN is a "virtual local area network" of users having full connectivity (sharing broadcast, multicast and unicast messages) independent of any particular physical or geographical location. In other words, users that share a virtual LAN appear to be on a single LAN segment regardless of their actual location. Although the term "VLAN" is widely used as a new method of solving the increasing demand for bandwidth, the effectiveness of existing VLAN systems is wholly dependent on the particular implementation. For example, a VLAN implementation which allows VLAN assignments to end systems, as well as ports, provides a more effective means of VLAN groupings. Other performance-determining characteristics include the manner of resolving unknown destination and broadcast traffic (which consume both network bandwidth and end system CPU bandwidth), the ability to allow transmission out multiple ports, hop-by-hop switching determinations (as opposed to determination of a complete path at the call-originating switch), and whether multi-protocol routers are required to enable transmission between separate VLANs.

Each of these may have an important effect on the total number of connections in trunk switches, the CPU load in the trunk switches, the speed of connection setup, and the scalability of the system, i.e., ability to maintain performance with increasing numbers of end stations and/or switches.

SUMMARY OF THE INVENTION

In accordance with the present invention, a method and apparatus are provided for connection-oriented switching in a communications network. In a connection-oriented communication, a logical association is established between a source end station and a destination end station, so that several separate groups of data ("a data flow") may be sent along the same path that is defined by the logical association. This is distinguished from connectionless communications, wherein each frame of data is transmitted node-by-node independently of the previous frame.

In general, there are three phases which occur during a connection-oriented communication: connection establishment; data transfer; and connection termination. In the connection establishment phase, the first time a source has data to be sent to a destination, a logical association, also called a connection or a path, is established between the source and the destination. The connection defines nodes and connections between the nodes, for example, the switches between the source and destination, and the ports of the switches through which the data will pass. The path set up at the establishment phase is the path on which the data will be transmitted for the duration of the active connection. During the data transfer phase, data is transmitted from the source to the destination along the connection, which includes the port-to-port connections of the switches. Generally, after a certain amount of time, or at the occurrence of a certain event, the connection enters the termination phase, in which the connection is terminated, and the switches which made up the connection are freed to support other connections.

In accordance with the present invention, a technique referred to as "connection aggregation" is provided in order to reduce the total number of connections required between the switches (i.e., inside the switch cloud). Connection aggregation entails providing a pre-established path between a select pair of an ingress switch (connected to the source end station) and an egress switch (connected to the destination end station). By establishing predetermined paths, only the ingress and egress switches need be involved in the connection setup phase, thereby reducing the connection setup time. In addition, providing predetermined paths reduces the number of connections required to be maintained in the trunk switches, and reduces the CPU load in each trunk switch.

In accordance with the invention, a "virtual path ID" is used to describe the path to be taken between an ingress device and egress device (i.e., switches). A "virtual circuit ID" is used to describe which two endpoints (i.e., source and destination end stations) are attached by the virtual path. In one embodiment described herein, the destination address (DA) and source address (SA) fields in a MAC frame packet are replaced with the virtual path ID, the virtual circuit ID is inserted in a VLAN-ID field, and a packet identifier marking this as an aggregated packet is added to create a modified packet which is then sent on the pre-established path to the egress switch. In this embodiment, the 96-bit virtual path ID includes a 48-bit destination MAC address of the in-port of the egress switch (to which the destination end station is connected). The virtual path ID also includes a 24-bit path identifier (02:PP:PP) in which the local administered bit is set, and the remaining 16 bits (PP:PP) identify one of 65K unique paths to the egress switch. Because the virtual path ID must be unique not only to a particular switch, but also unique within the switch cloud, the last 24 bits (of the virtual path ID) contain the lower 24 bits of the ingress switch MAC address (XX:YY:ZZ). The ingress and egress switches exchange their MAC addresses so each has the necessary information. Each switch on the predetermined virtual path has been set, prior to the connection setup phase, by for example entering a connection in its switching table (connection database) which maps an in-port and out-port to the virtual path ID.

The virtual circuit ID is assigned during the connection setup phase by the egress switch and sent to the ingress switch in response to the connection request. When the modified packet is received by the egress switch, the virtual circuit is used to restore the original packet in order to send the restored packet to the destination end station. The other switches in the path, between the ingress and egress switches, do not need to use the virtual circuit field in the forwarding decision.

These and other aspects of the present invention will be more fully described in the following detailed description and drawings.

BRIEF DESCRIPTION OF THE DRAWINGS

FIG. 3A is a schematic logical representation of a pre-established path between a source end station and destination end station, and FIG. 3B shows the corresponding portions of the data packet as it is transmitted from the source, through the ingress switch, cloud switch and egress switch to the destination;

FIG. 4A shows a process for handling a data packet at an ingress switch;

FIG. 4B shows a process for handling a modified packet at a cloud switch;

FIG. 4C shows a process for handling a modified packet at an egress switch;

FIGS. 6A–6B is an example of a local directory cache;

FIGS. 7A, 7B and 7C are examples of the following databases: link state, link state neighbor, and link state switching, respectively;

DETAILED DESCRIPTION

FIGS. 1–4C illustrate generally the connection aggregation scheme of the present invention. FIGS. 5–13 provide a more detailed description of a specific embodiment and implementation of the invention.

Figure 1:
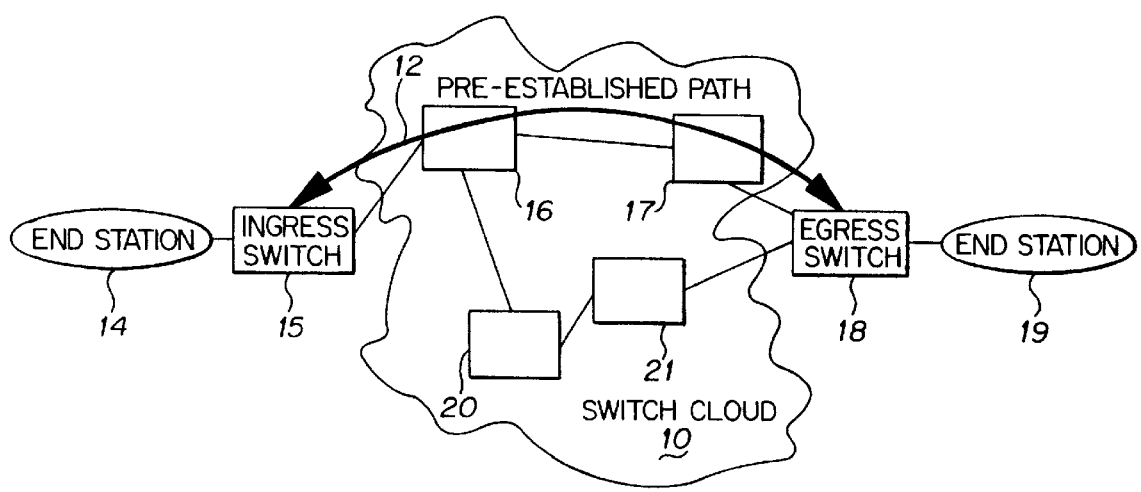
FIG. 1 is a schematic logical representation of a pre-established path in a switch cloud between an ingress switch and egress switch, connecting a source end station and destination end station in accordance with this invention.

FIG. 1 shows a switch cloud 10 including a plurality of trunk switches 16, 17, 20 and 21. A pre-established path 12 is provided between an ingress switch 15, connected to a source end station 14, and an egress switch 18, connected to a destination end station 19. The pre-established path includes trunk switches 16 and 17 between ingress switch 15 and egress switch 18.

FIGS. 2–4C illustrate by way of example how a MAC frame data packet is modified to enable switching along the pre-established path. It is assumed, as will be described later, that the virtual path 12 is already in place, and known to all switches 15, 16, 17, 18 on the path, prior to connection setup.

A MAC frame packet is sent from source end station 14, which is intended for destination end station 19. The packet includes a header portion 30 which includes the fields 31–34 shown in FIG. 2A. Field 31, labeled "DA", is the unique MAC (Media Access Control) address of the destination end station 19. Field 32, labeled "SA", contains the MAC address of the source end station 14. Field 33, labeled "Ether Type", contains the IEEE defined VLAN (L1/L2) type field. Field 34, labeled "VLAN ID", is an optional field.

A "MAC frame" packet is a connectionless packet as described in IEEE Publication 802.3. As described therein, a MAC frame generally contains the following fields: preamble; start frame delimiter; destination address; source address; type/length field; payload (i.e., data and padding); and frame check sequence.

Figures 2A, 2B:
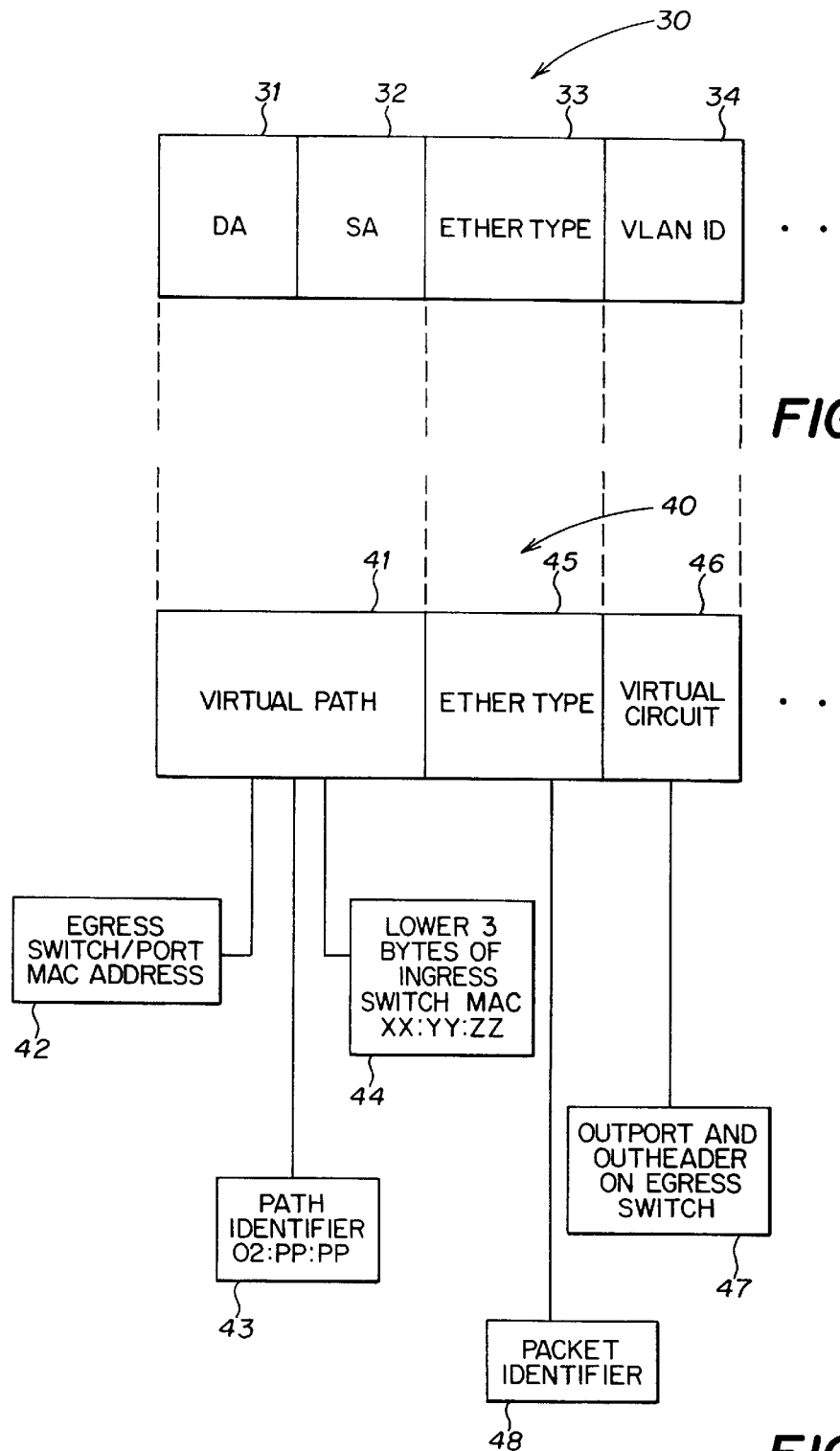
FIG. 2A is a portion of a MAC frame data packet sent by an end station, showing select fields.
FIG. 2B shows the corresponding fields of a modified packet as determined during connection setup by the ingress switch.

The data packet containing header 30, is transmitted to ingress switch 15, where the header portion 30 is modified to become header portion 40. As shown in FIGS. 2A–2B, the header portion 40 includes three fields, which correspond to the fields in header portion 30 connected by dashed lines. The combined fields 31 and 32 (DA and SA) become the virtual path field 41. The Ether Type field 33, which is modified to contain a packet type identifier which indicates that this is an aggregated packet, becomes the Ether Type field 45. The VLAN ID field 34 becomes the virtual circuit field 46.

In this disclosure, a field may be modified by inserting or overlaying the new data in a field; thus, modifying a packet by "adding" information is meant to include inserting and/or overlaying. In addition, the specific fields which may be modified are not limited to those modified in the present embodiment; depending on the application, another field may be utilized.

The virtual path identifies the pre-established path to be taken between the ingress switch 15 and egress switch 18. As shown in FIG. 2B, the virtual path field 41 has three portions 42–44. The first portion 42 contains the 48-bit MAC address of the egress switch and its port instance which connects to the destination end station 19. The second portion 43 contains a 24-bit path identifier (02:PP:PP), in which the local administered bit is set and PP:PP identifies one of 65K unique paths to the egress switch. The third portion 44 contains the lower three bytes (24 bits) of the MAC address of the ingress switch 15 (XX:YY:ZZ). This scheme guarantees that the 96-bit virtual path (in field 41) is unique within the switch cloud. Ether Type field 45 contains the packet identifier 48 and virtual circuit field 46 contains the out-port and out-header 47 on the egress switch 18.

FIG. 4A is a flow chart illustrating the steps performed at the ingress switch. In step 49, a MAC frame data packet arrives at the ingress switch 15 from the source end station 14. A look-up is performed on the DA-SA (and any other relevant fields) and the DA-SA fields 31–32 are replaced with the virtual path ID 41 (step 50). The look-up table provides mappings between the source and destination MAC addresses and the egress switch/port MAC address 42, the path identifier 43, and the lower three bytes of the ingress switch MAC 44. The Ether Type field is modified to include the packet identifier (step 51). In addition, the virtual circuit is inserted in the VLAN field 34 (step 52). To accomplish this, the DA/SA is sent by the ingress switch to the egress switch as part of a connection request; the egress switch then maps a new connection in its lookup table (database) in which it assigns a virtual circuit ID number to the connection and stores the DA/SA in its table; the egress switch then sends the virtual circuit ID back to the ingress switch (in response to the connection request). The packet thus modified (by the ingress switch) is forwarded to the next switch (step 53), which in this case is cloud switch 16.

As illustrated in the flow chart of FIG. 4B, the modified packet arrives at cloud switch 16 (step 60). A look-up is performed based on the virtual path ID to determine the out-port (step 61). Then, the modified packet is forwarded from this out-port to the next switch (step 62).

After similar transmission through cloud switch 17, the modified packet arrives at egress switch 18 (step 70 in FIG. 4C). A connection look-up is performed based on mapping the virtual path ID and virtual circuit ID to the out-port and out-header, to enable restoration of the original MAC frame packet and transmission to the destination end station (step 71). The virtual path in the modified packet is replaced with the DA/SA (step 72), the virtual circuit is removed from the VLAN field (step 73), and the packet identifier in the Ether Type field is replaced with the original information. The restored (re-assembled) original packet is then forwarded to the destination end station (step 74). Thus, the packet that came into the cloud is the same as the packet that comes out of the cloud.

There will next be described a specific embodiment for implementing the present invention. Various aspects of this embodiment may be more particularly described in copending and commonly owned U.S. Ser. No. 08/626,596 entitled "Distributed Connection-Oriented Services For Switched Communications Networks," filed Apr. 2, 1996 by K. Dobbins et al., and hereby incorporated by reference in its entirety.

Figure 5:
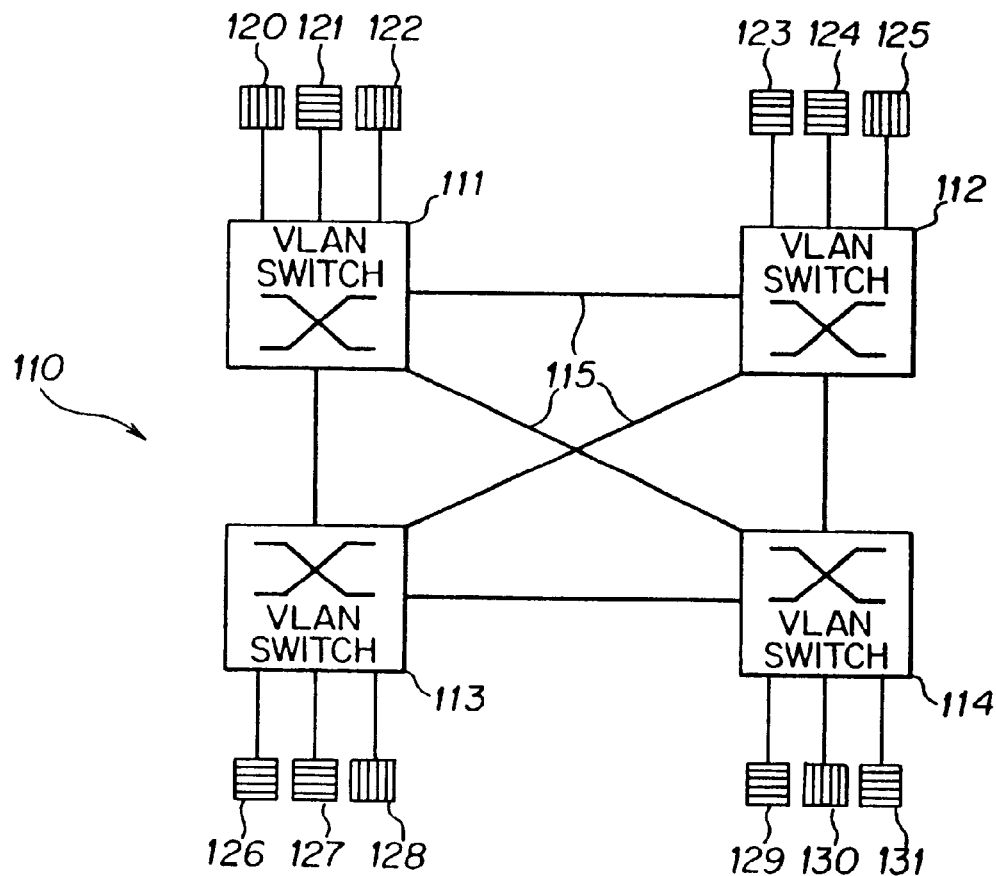
FIG. 5 is a schematic logical representation of a VLAN switch domain, including multiple VLANs.

FIG. 5 illustrates generally a logical view of an exemplary switched network with end systems (stations) on different VLANs. The representative network 110 has four switches 111–114, all of the switches being connected in a meshed topology by physical links 115 between network ports forming, e.g., point-to-point connections. The plurality of end systems 120–131 extend from access ports on various switches. The end systems are grouped into different subsets which have different VLAN identifiers (VLAN-IDs): default VLAN (117), red VLAN (118), and blue VLAN (119), respectively. As shown in FIG. 5, red VLAN includes end systems 120, 122, 125, 128 and 130, and blue VLAN includes end systems 121, 123, 124, 126, 127, 129 and 131. Default VLAN is a special VLAN to which all ports and end systems are initially assigned; after being reassigned to another VLAN, they are removed from the default VLAN.

The operation of this exemplary VLAN network will be discussed under the following subsections:

Directory Administration
Link State Topology Exchange
Path Determination.
Directory Administration During a discovery time, each switch discovers its local connected end systems (i.e., switch 111 in FIG. 5 discovers end systems 120–122) in order to provide a mapping of end system MAC addresses to access ports, as well as a mapping of end system MAC addresses (or access ports) to VLAN-IDs. In this particular embodiment, a local directory is provided (see FIGS. 6A–6B) which contains all node-related information including:

the node (e.g., machine address of the end system)

any upper layer (alias) protocol addresses discovered with the node the VLAN-IDs to which the node is mapped the local switch port(s) on which the node was discovered (plural for redundant links)

the owner switch(es) hardware address (plural for redundant access switches).

As shown in FIG. 6A, the local directory of nodes includes in column order: the "Switch Port" (to which the end system is attached); the "Device MAC Address" (for the attached end system or switch); the "Node State" ("local" for an attached end system, "virtual node" for an attached switch); "Call Tag" (for the call associated within this entry); "Last Heard" (the elapsed time since the attached device was last heard from); "Age" (the time since the node was discovered); "Alias Count" (the number of alias' mapped to the MAC end system); and "VLAN Count" (the number of VLANs to which the entry belongs).

FIG. 6B includes a mapping of user MAC address to higher-layer protocol ("alias") addresses, such as network layer addresses, client addresses and server addresses. Use of these higher-layer protocol addresses enables a VLAN management application to verify or place users in the correct location. For example, if a red VLAN maps to IP subnet 42, then the network layer mappings for all red VLAN users should show an IP address that also maps to subnet 42. The Local Directory with alias address information as shown in FIG. 6B includes the fields: "Owner Switch" (the owner of the attached end system); "Switch Port"; "Device MAC Address"; "Alias Type" (e.g., IP or IPX); "Alias Address"; "VLAN Policy" (discussed hereinafter); and "VLAN-ID" (e.g., red, blue, default).

The end system and/or VLAN mappings may be provided by an external application. Whether the mappings at each local access switch are done implicitly (e.g., by using a mapping criteria table or protocol-specific mappings) or explicitly (e.g., by using an external management application), the key point is that each access switch only maintains its locally attached users. Taken as a group, this combination of local directories provides a "Virtual Directory" which can easily scale to fairly large numbers of users.

Assignment of VLANs to individual ports is the simplest embodiment to administer and to engineer in a switch. A switch port can be assigned to more than one VLAN; however, all users on a port with multiple VLANs will see all of the cross-VLAN traffic. Alternatively, VLANs can be assigned based on IP subnets or end system MAC addresses.

In order to provide connectivity "out of the box" (prior to any VLAN administration), by default all switch ports and end systems belong to a common VLAN (for tag-based flooding), known as the default VLAN 119 (see FIG. 5). Once a port or end system is assigned to a specific VLAN, it is automatically removed from the default VLAN.

It may also be desirable to have VLAN switches discover and automatically place end systems in one or more reserved VLANs. For example, as switches discover IPX servers, they would be placed in the "IPX server" VLAN.

External services may communicate with the local directory via its application programming interface (API). Information may be added to the directory by those applications that require node-related information to make switching decisions. The directory maintains the node information based on a set of rules, until the node is removed. External services may also request for a node to be deleted via the API.

As implemented in an object-oriented programming language, such as C++, the directory may comprise a class which provides the common API and manages the directory nodes and any tables used for queries. For example, the directory node table (FIG. 6a) and directory alias table (FIG. 6b) enable bi-directional queries, e.g., node-to-alias, or alias-to-node.

Link State Topology Exchange

A path determination algorithm is used to determine the pre-established paths between switches. For example, a shortest path may be chosen based upon metrics such as summation of link cost, number of calls allocated on each link in the path, etc. Alternatively, multiple equal-cost paths to a given destination may be chosen to provide load balancing (i.e., distribution of the traffic over the multiple paths equally). However, before a path to a destination can be chosen, the inter-switch topology must be determined.

In this embodiment, a specific link state protocol is defined for the determining the inter-switch topology. For a general discussion of link state routing, see Radia Perlman, "Interconnections: Bridges and Routers" (Reading, Mass.: Addison-Wesley, 1992), pages 221–222. Other link state protocols may be used in the present invention in order to enable path determination.

There are four basic components of a link state routing method. First, each switch is responsible for meeting its neighbors and learning their names. Hello packets are sent periodically on all switch interfaces in order to establish and maintain neighbor relationships. In addition, hellos may be multicast on physical media having multicast or broadcast capability, in order to enable dynamic discovery of a neighboring switch.

All switches connected to a common network must agree on certain parameters, e.g., hello and dead intervals, etc. These parameters are included in the hello packets; differences in these parameters will inhibit the forming of neighbor relationships. For example, the hello interval designates the number of seconds between a switch's hello packets. The dead interval defines the number of seconds before declaring a silent (not heard from) switch down. The hello packet may further include a list of neighbors, more specifically the switch IDs of each switch from whom valid hello packets have recently been seen on the network; recently means in the last dead interval.

A second basic component (of a link state method) is that each switch constructs a packet known as a "link state packet" or "LSP" which contains a list of the names and costs to each of its neighbors. Thus, when an adjacency is being initialized, "database description packets" are exchanged which describe the contents of a topological database. For this purpose, a poll-response procedure is used. One switch is designated a master, and the other a slave. The master sends database description packets (polls) which are acknowledged by database description packets sent by the slave (responses). The responses are linked to the polls via the packet's sequence numbers.

The main portion of the database description packet is a list of items, each item describing a piece of the topological database. Each piece is referred to as a "link state advertisement" and is uniquely identified by a "link state header" which contains all of the information required to uniquely identify both the advertisement and the advertisement's current instance.

A third basic component (of a link state method) is that the LSPs are transmitted to all of the other switches, and each switch stores the most recently generated LSP from each other switch.

For example, after exchanging database description packets with a neighboring switch, a switch may find that parts of its topological database are out of date. A "link state request packet" is used to request the pieces of the neighbor's database that are more up to date. The sending of link state request packets is the last step in bringing up an adjacency.

A switch that sends a link state request packet has in mind the precise instance of the database pieces it is requesting (defined by LS sequence number, LS checksum, and LS age). It may receive even more instances in response. Each advertisement requested is specified by its LS type, link state ID, and advertising switch. This uniquely identifies the advertisement, but not its instance. Link state request packets are understood to be requests for the most recent instance (whatever that might be).

"Link state update packets" carry a collection of link state advertisements one hop further from its origin; several link state advertisements may be included in a single packet. Link state update packets are multicast on those physical networks that support multi-cast/broadcast. In order to make the flooding procedure reliable, flooded advertisements are acknowledged in "link state acknowledgment packets." If retransmission of certain advertisements is necessary, the retransmitted advertisements are carried by unicast link state update packets.

In summary, there are five distinct types of link state advertisements, each of which begins with the standard link state header:

hello
database description
link state request
link state update
link state acknowledgment.

Each link state advertisement describes a piece of the switch domain. All link state advertisements are flooded throughout the switch domain. The flooding algorithm is reliable, insuring that all switches have the same collection of link state advertisements. This collection of advertisements is called the link state (or topological) database. From the link state database or table (see FIG. 7A), each switch constructs a shortest path tree with itself as the root. This yields a link state switching table (see FIG. 7C), which is keyed by switch/port pair. FIG. 7B is an example of a link state neighbor table.

The following fields may be used to describe each switch link.

A "type" field indicates the kind of link being described. It may be a link to a transit network, to another switch, or to a stub network.

A "link ID" field identifies the object that this switch link connects to. When connecting to an object that also originates a link state advertisement (i.e., another switch or a transit network), the link ID is equal to the other advertisement's link state ID. The link ID provides the key for looking up an advertisement in the link state database.

A "link data" field contains information which depends on the link's type field. For example, it may specify a switch's associated port name, which is needed during building of the switching table, or when calculating the port name of the next hop.

A "metrics" field contains the number of different "types of service" (TOS) metrics for this link, not counting a required metric field TOS 0. For each link, separate metrics may be specified for each type of service. The metric is the cost of using an outbound switch link, for traffic of the specified TOS.

Every switch originates a "switch links" advertisement. In addition, at any given time one of the switches has been elected to serve as the "Designated Switch." The Designated Switch also originates a "network links" advertisement for each transit network (i.e., multi-access network that has more than one attached switch) in the area. The "network links" advertisement describes all switches attached to the network, including the designated switch itself. The advertisement's link state ID field lists the Switch ID of the designated switch. The distance from the network to all attached switches is zero, for all types of service; thus the TOS and metric fields need not be specified in the "network links" advertisement.

A fourth main component (of a link state method) is that each switch, now armed with a complete map of the topology (the information in the LSPs yields complete knowledge of the graph), computes a path to a given destination. Thus, once the LSPs have been distributed and proper protocol adjacencies formed, a Dijkstra algorithm (see R. Perlman, pp. 221–222, supra) may be run to compute routes to all known destinations in the network. This is discussed further in the following section entitled "Connection Management."

Some of the beneficial features of the link state protocol described herein are summarized below.

The link state protocol does not require configuration information. Instead, it employs the MAC address of a device for unique identification. Ports are also uniquely identified using the switch MAC address and a port number instance.

In addition, the link state protocol has no network layer service provider, as it operates at the MAC layer. As a result, the protocol incorporates the required features that are typically provided by a network layer provider, such as fragmentation.

In order to provide network layer services, the link state protocol uses a well-known Cabletron Systems, Inc. multicast address (01001D000000) for all packets sent and received. This enables all media to be treated as shared broadcasts, simplifying the protocol.

Due to the "flat" nature of switched fabrics, and the unrelated nature of MAC address assignments, the present protocol does not provide for summarization of the address space (or classical IP subnet information), or level 2 routing (IS-IS Phase V DECNet). There exists a single area, and every switch within that area has a complete topology of the switch fabric.

Because a single domain exists for the switch fabric, there is no need to provide for interdomain reachability.

Rather than calculating the best next hop as in other link state shortest path first algorithms, the present protocol method calculates the best next hops for the entire path. This is significant in that the path is only determined once, instead of at each switch hop.

Path Determination

The following is a general example of applying metrics to the path determination.

EXAMPLE

Figure 8:
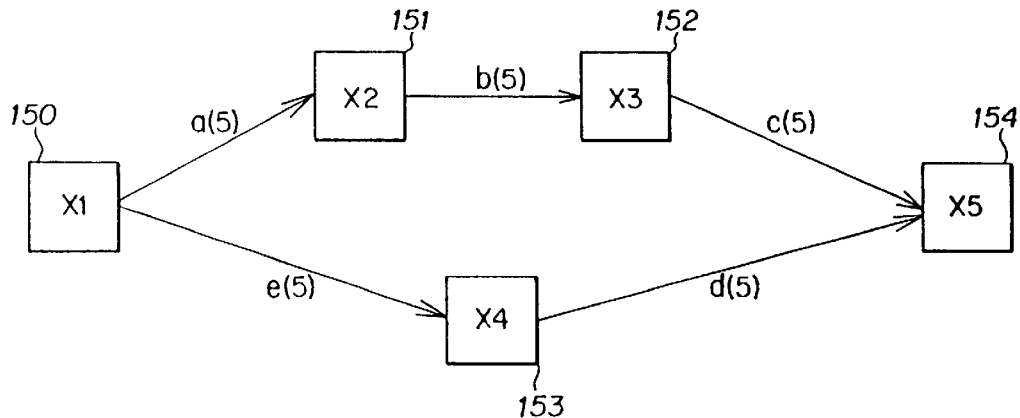
FIG. 8 is a schematic illustration of a portion of a switched network to illustrate an example of a path determination service.

As illustrated in FIG. 8, a path may be determined from a call-originating switch X1 (150), for a destination switch X5 (154). The protocol returns the best (meaning lowest aggregated metric) path to X5. This would be the path "e,d" (through switch X4 (153)), assuming like media and default metric assignments. Path "e,d" has a value of 10. Path "a,b,c" (through switches X2 (151) and X3 (152)) has value of 15 and would not be chosen. Should link "e" fail, the path "a,b,c" would take over and continue to provide connectivity. Should the value of the metric be manipulated such that path "a,b,c" and path "e,d" were of equal value, the protocol would return both as possible paths.

Once a path between an ingress switch and egress switch is determined i.e., the pre-established or virtual path), the ingress switch sends a source-routed connect message (containing an in-order list of switch nodes and links in the path) to set all switches on the path. Each switch on the path maps a connection in its switching table (FIG. 7c) based on the virtual path identifier. The final (egress) switch on the path sends a path acknowledgment signal back to the ingress switch. Later, when the ingress switch receives a data packet intended for a destination attached to the egress switch, it forwards the data along the virtual path.

Exemplary FPS Network and Switches

Figure 9:
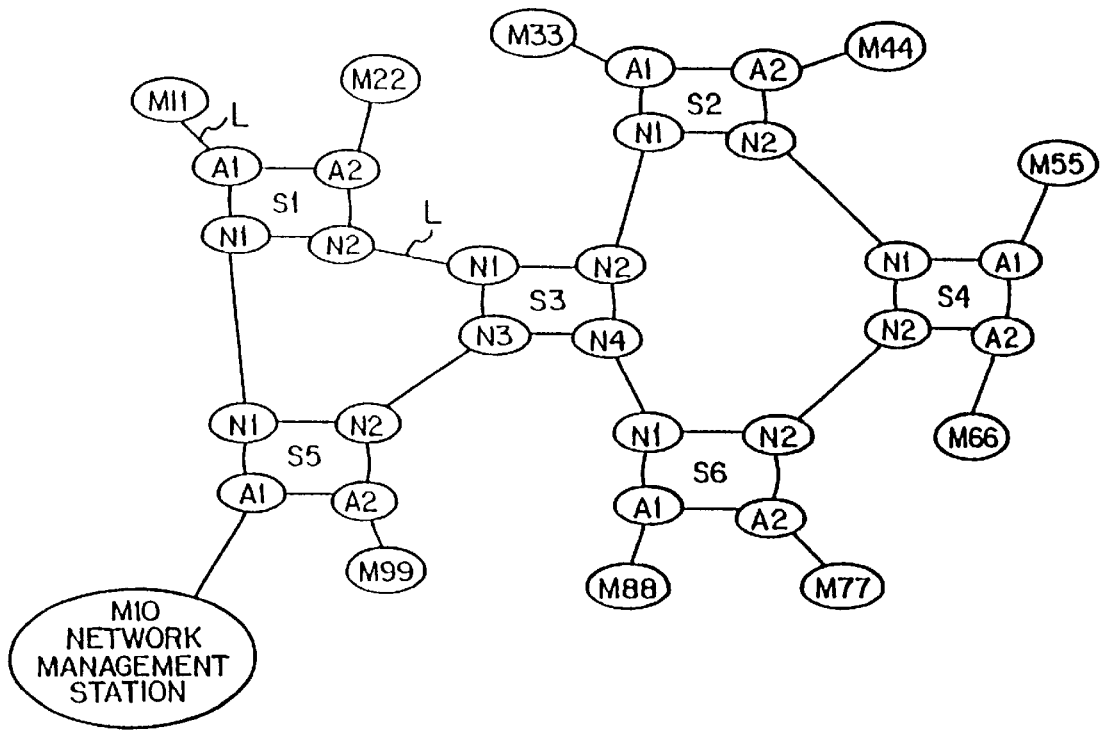
FIG. 9 is a schematic illustration of a network topology built with FPS switches.

FIG. 9 shows a representative network topology built with six fast packet switches (FPS) labeled S1–S6 and connected by links L. Each switch has for example four ports; some ports are labeled A for access and some are labeled N for network. The end systems are connected to the access ports by links L and are labeled "M__". One end system is a network management station (NMS) or server (M1O), which may also include an external connection service and/or a VLAN management application.

Figure 10:
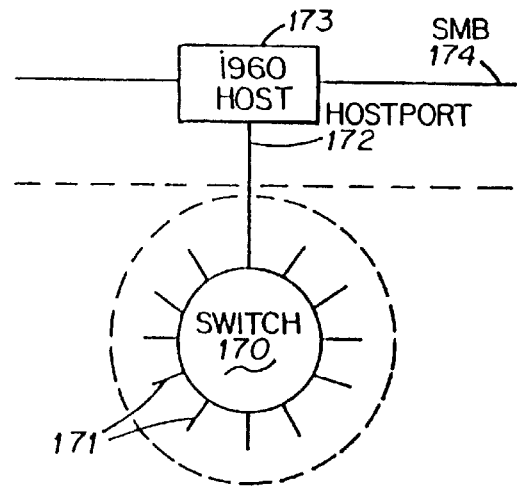
FIG. 10 is a schematic illustration of an FPS switch.

FIG. 10 is a schematic illustration of an FPS switch 170 having a plurality of ports 171. A host port 172 connects the switch to its host CPU 173, which may be an 1960 microprocessor sold by Intel Corporation. The host CPU is connected to a system management bus (SMB) 174 for receipt and transmission of discovery and other control messages.

Figure 11:
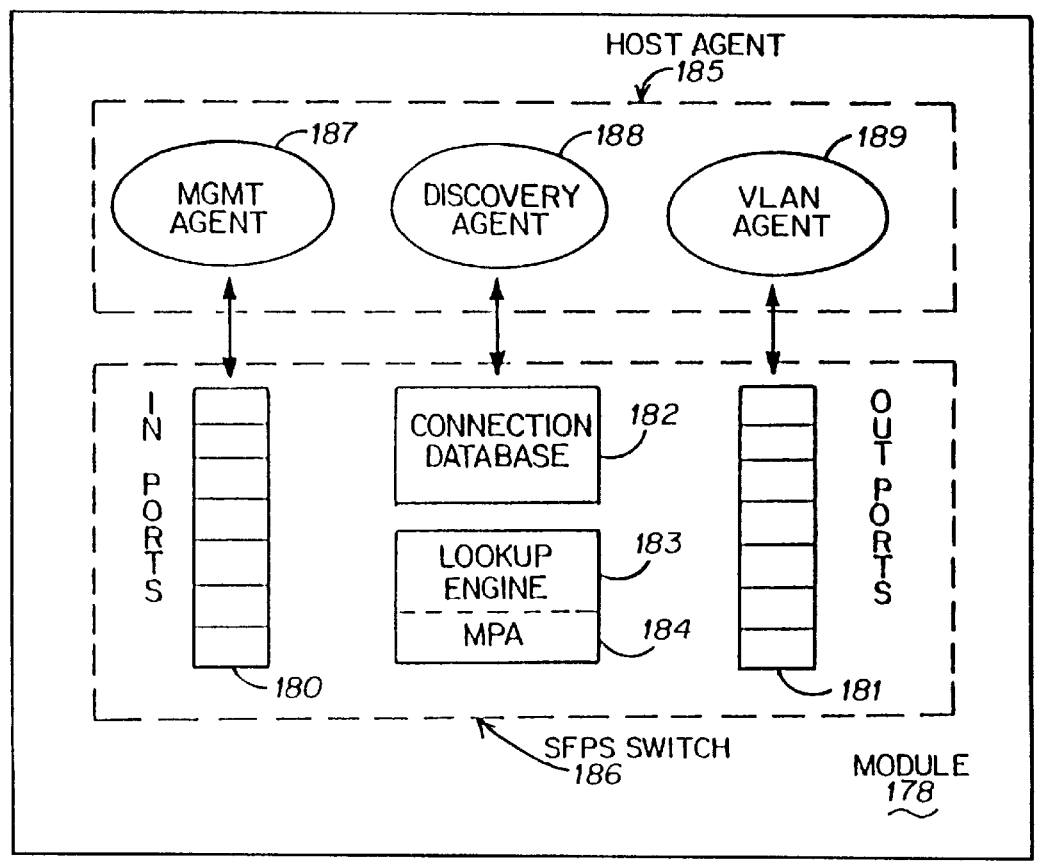
FIG. 11 is a logical view of an FPS switch.

FIG. 11 illustrates the internal operation of a switch module 178. The FPS switch 186 includes in-ports 180, out-ports 181, a connection database 182, a look-up engine 183, and a multilevel programmable arbiter MPA 184. The FPS switch 186 sends and receives messages from the host agent 185, which includes a management agent 187, a discovery agent 188, and a VLAN agent 189. The management agent 187 provides external control of the switch through the network management system M1O. The discovery agent 188 provides a mapping of local end systems to switching ports through a passive listening (snooping) capability. Adjacent switches are also discovered and mapped through an explicit switch-to-switch protocol (non-passive). The VLAN agent maps VLANs to access ports or end systems.

Figure 12:
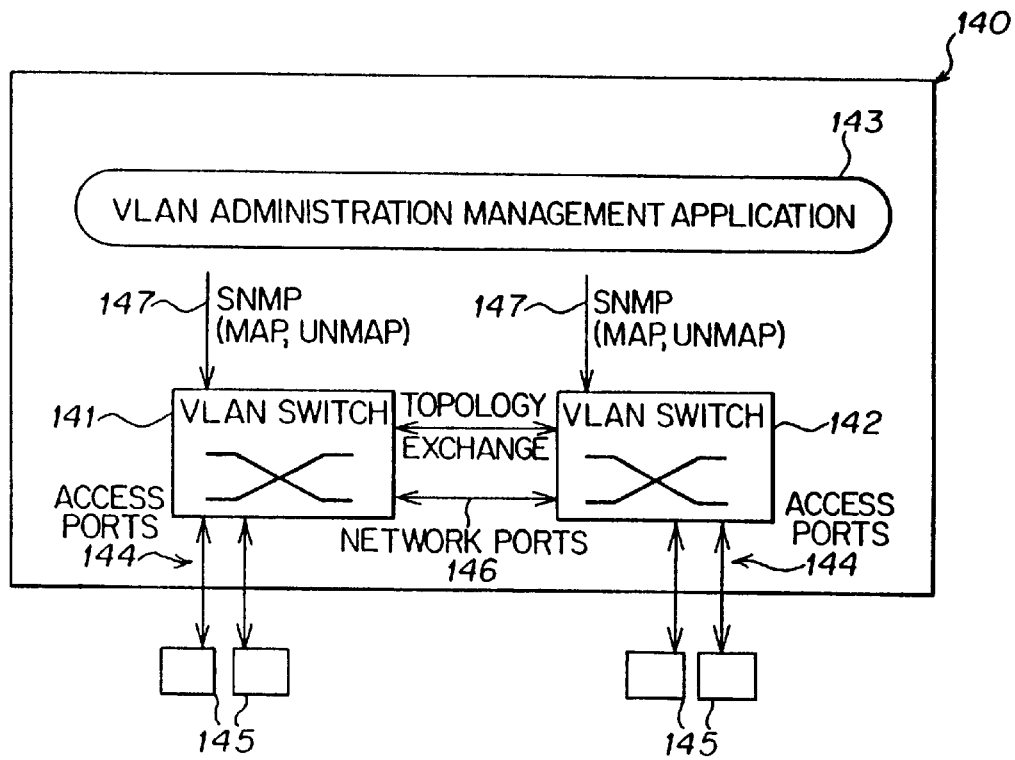
FIG. 12 is a schematic illustration of a VLAN domain, illustrating the management of the VLAN switches.

FIG. 12 illustrates schematically a VLAN domain 140 in which a plurality of VLAN switches 141, 142 are managed by a VLAN management application 143. The switches have access ports 144 connected to end systems 145, and network ports 146 connecting the switches. As previously discussed, a topology exchange occurs between switches 141 and 142. The management application 143 communicates with each switch on links 147 via the SNMP (Simple Network Management Protocol) messaging protocol.

The switches may contain SMNP MIBs for element management and remote control of the switch elements. The managed objects accessible by the MIB (Management Information Base) may be accessed with the standard SNMP Get, GetNext, and Set messages. The MIB interface allows an external application to assign the VLAN mappings to access ports and/or end systems.

Figure 13:
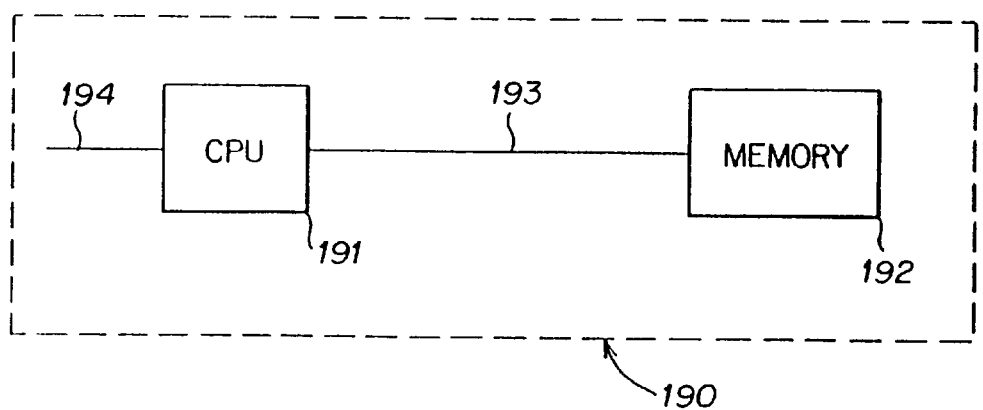
FIG. 13 is a schematic illustration of a computer apparatus.

Any of the above embodiments may be implemented in a general purpose computer 190 as shown in FIG. 13. The computer may include a computer processing unit (CPU) 191, memory 192, a processing bus 193 by which the CPU can access the memory 192, and access to a network 194.

The invention may be a computer apparatus which performs the functions of any of the previous embodiments.

Alternatively, the invention may be a memory 192, such as a floppy disk, compact disk, or hard drive, which contains a computer program or data structure, for providing to a general purpose computer instructions and data for carrying out the functions of the previous embodiments.

In an alternative embodiment, the "Ether type" field 33 could be used instead of the "VLAN-ID" field 34 for demultiplexing the modified frame. With this approach, the Ether type field 45 is remapped over the existing Ether type field 33 of the packet on the ingress switch. On the egress switch, the Ether type field 45 is used to demultiplex the frame, and the original frame is restored.

In another alternative embodiment, layer 3 (i.e., network layer) switching could be used instead of layer 2 switching in the ingress switch as previously described to accomplish aggregation. In this approach, the layer 3 connection would point to the appropriate virtual path/virtual circuit. The egress switch would still be multiplexed on the level 2 address. Providing layer 3 aggregation allows different quality of service parameters to be used for different MAC addresses and in essence, provides a higher level of fidelity than layer 2.

To enable multicasting, special multicast aggregated connections could be programmed through the switch cloud. These connections could be established per VLAN, allowing multiple multicast destinations to be served by a single set of connections.

Because the virtual path 31 is a DA-SA pair, it is possible to operate this invention with legacy devices serving as trunk switches. If a legacy device is an ingress or egress switch, then: (1) aggregation cannot be used for traffic terminating with that device; or (2) the packet must be demultiplexed by the last non-legacy switch in the cloud before the legacy switch.

Having thus described several particular embodiments of the invention, various modifications and improvements will readily occur to those skilled in the art. Accordingly, the foregoing description is by way of example only, and not intended to be limiting.

What is claimed is:

1. A method of forwarding a data packet along a pre-established path in a switched communications network, the method comprising:
   receiving a MAC frame packet at an ingress switch, the packet including a source address of a source node and a destination address of a destination node;
   determining a virtual path ID that describes the pre-established path from the ingress switch to an egress switch attached to the destination node through one or more intervening switches;
   adding the virtual path ID to the packet to create a modified packet;
   sending the modified packet on the pre-established path to the egress switch.

2. The method of claim 1, further comprising:
   determining a virtual circuit ID for the source address and destination address;
   removing the source address and destination address from the packet and adding the virtual circuit ID to create the modified packet.

3. The method of claim 1, further comprising:
   upon receiving the packet at the egress switch, creating a restored MAC frame packet and forwarding the restored packet to the destination node.

4. The method of claim 1, wherein each switch on the pre-established path between the ingress switch and egress switch forwards the packet based on only the virtual path ID.

5. The method of claim 1, wherein the virtual path ID includes an identifier for the pre-established path, at least part of an address for the egress switch, and at least part of an address for the ingress switch.

6. The method of claim 2, wherein the egress switch determines the virtual circuit ID of the pre-determined path and forwards the virtual circuit ID to the ingress switch.

7. The method of claim 2, wherein the virtual circuit ID comprises an out-port and out-header on the egress switch to the destination.

8. The method of claim 2, wherein the egress switch determines the destination address based on the virtual path ID and virtual circuit ID.

9. The method of claim 2, wherein the virtual circuit ID is removed from the packet by the egress switch.

10. The method of claim 1, wherein the source address and destination address are removed from the packet at the ingress switch and replaced by the virtual path ID.

11. The method of claim 10, wherein the virtual path ID is removed from the modified packet by the egress switch and replaced by the destination address and source address determined from the virtual path ID.

12. A method of forwarding MAC frame data packets along a pre-established path in a switched communications network, the network including a plurality of source and destination end systems and switches connected by links, the switches having access ports connected to end systems and network ports connected to other switches, and each end system having a unique physical address, the method comprising the steps of:
   when a first packet is received on an access port of an ingress switch, the ingress switch determining a virtual path ID that describes the pre-established path from the ingress switch to an egress switch attached to a destination end system through one or more intervening switches, modifying the first packet to include the virtual path ID and forwarding the modified packet to the egress switch on the pre-established path.

13. The method of claim 12, wherein the ingress switch replaces a destination address/source address field in the first packet with the virtual path ID, and the modified packet further includes a virtual circuit ID for determining an out-port and out-header on the egress switch to the destination end system.

14. The method of claim 12, wherein an intermediate switch on the established path between the ingress switch and egress switch, forwards the packet based upon the virtual path ID.

15. The method of claim 13, wherein the egress switch replaces the virtual path ID with the destination address and source address of the first packet, and removes the virtual circuit ID.

16. A method of determining pre-established paths in a switched communications network, wherein data packets are communicated along the paths, the network including a plurality of source and destination end systems and switches connected by links, the switches having access ports connected to end systems and network ports connected to other switches, and each end system having a unique physical address, the method comprising the steps of:
   prior to a connection setup for establishing communication between a source end system and destination end system, determining the pre-established paths between different pairs of ingress and egress switches, which pre-established paths are known to the respective ingress and egress switches and each intermediate switch therebetween on the pre-established path; and at a connection setup phase when a MAC frame data packet identifying the destination is received at an ingress switch, the ingress switch and an egress switch connected to the destination exchanging a message which identifies an out-port and out-header on the egress switch for modifying and transmitting the data packet addressed to the destination.

17. A method of forwarding a plurality of groups of data along a single pre-established path in a switched communications network, the network including a plurality of source and destination end systems and switches connected by links, the switches having access ports connected to end systems and network ports connected to other switches, and each end system having a unique physical address, the method comprising the steps of:

determining a single pre-established path between a select pair of ingress and egress switches through one or more intervening switches for forwarding a plurality of groups of data therebetween;

processing, by the ingress switch, the plurality of groups of data to be forwarded between the select pair wherein each of the plurality of groups of data represents a separate data flow; and forwarding the plurality of groups of data along the single pre-established path.

18. A method of forwarding data packets along a pre-established path in a switched communications network, the network including a plurality of source and destination end systems and switches connected by links, the switches having access ports connected to end systems and network ports connected to other switches, and each end system having a unique MAC address, wherein data packets containing MAC addresses for the source and destination end systems are transmitted on the network, the method comprising the steps of:

replacing the MAC addresses in the data packet with a virtual path ID that describes the pre-established path from an ingress switch, connected to the source end system, to an egress switch through one or more intervening switches, the egress switch being connected to the destination end system; and forwarding the data packet along the pre-established path.

19. A method of forwarding data packets along a pre-established path in a switched communications network, the network including a plurality of source and destination end systems and switches connected by links, the switches having access ports connected to end systems and network ports connected to other switches, and each end system having a unique MAC address, wherein data packets containing addressing data including MAC addresses for the source and destination end systems are transmitted on the network, the method comprising the steps of:

transmitting a data packet from an ingress switch, connected to a source end system, to an egress switch, connected to a destination end system, on the pre-established path from the ingress switch to the egress switch, wherein the addressing data of the data packet is reformatted only at the ingress and egress switches.

20. An apparatus for forwarding a plurality of groups of data along a single one of a plurality of pre-established paths in a switched communications network, the network including a plurality of end systems and switches connected by links, the switches having access ports connected to end systems and network ports connected to other switches, and each end system having a unique physical address, the apparatus comprising:

each one of the switches having means for maintaining a connection database of pre-established paths between select pairs of ingress and egress switches through one or more intervening switches; and when a a plurality of groups of data is received on a port of one switch, the one switch having means for accessing its connection database to determine the single pre-established path of said plurality of pre-established paths upon which the plurality of groups of data is forwarded, and wherein each of the plurality of groups of data represents a separate data flow.

\* \* \* \* \*